United States Patent [19]

Eck

[11] Patent Number: 4,599,723
[45] Date of Patent: Jul. 8, 1986

[54] METHOD OF ENCODING DATA FOR SERIAL TRANSMISSION

[75] Inventor: Henry H. Eck, Catonsville, Md.

[73] Assignee: Pulse Electronics, Inc., Rockville, Md.

[21] Appl. No.: 580,172

[22] Filed: Feb. 14, 1984

[51] Int. Cl.$^4$ .............................................. H04L 7/00
[52] U.S. Cl. ...................................... 371/47; 371/70; 375/116
[58] Field of Search ...................... 371/70, 47; 360/40, 360/47, 53; 375/114, 116

[56] References Cited

U.S. PATENT DOCUMENTS

| | | | |
|---|---|---|---|
| 3,199,077 | 8/1965 | Prather | 371/70 |
| 3,449,717 | 6/1969 | Smith et al. | 371/70 |
| 4,045,771 | 8/1977 | Loreck | 371/70 |
| 4,369,516 | 1/1983 | Byrns | 371/70 X |
| 4,377,863 | 3/1983 | Legory et al. | 371/47 X |
| 4,389,636 | 6/1983 | Riddle, Jr. | 371/47 X |

Primary Examiner—Charles E. Atkinson
Attorney, Agent, or Firm—C. Lamont Whitham

[57] ABSTRACT

A technique for redundantly encoding data for synchronous or asynchronous serial transmission or recording and the correlative technique for decoding the serial bit stream are disclosed. The encoding technique involves making the second data string of a data string pair the complement of the first data string and formatting to the format $H_1$ Data $H_2$ $\overline{\text{Data}}$ where $H_1$ and $H_2$ are headers wherein at least one bit is the same in corresponding bit positions of the headers. Decoding involves first detecting the headers and then checking to confirm that the data fields are complements. Also disclosed is a technique for extracting bits from the data stream.

16 Claims, 3 Drawing Figures

METHOD OF ENCODING DATA FOR SERIAL TRANSMISSION

FIELD OF THE INVENTION

The subject invention is generally directed to a technique of encoding data for serial transmission and the correlative technique of decoding the transmitted data. The invention has particular application to the transmission of data from a remote location to a central receiving station and the recording of data on a magnetic recording medium or the like and its subsequent extraction. In other words, the invention is not limited to a particular application since the technique according to the invention can be used to advantage in many digital transmission and storage applications.

BACKGROUND OF THE INVENTION

Serial data transmission typically involves the encoding of the data to be transmitted in an appropriate code for the transmission medium and the framing of the encoded data into blocks of serial data for transmission. The purpose of framing the data is to provide identification codes and timing signals that facilitate the detection of the beginning and end of data and the synchronism necessary to permit decoding of the received data. In those applications where the signal to noise ratio is low, special efforts must be undertaken to insure that the integrity of the transmitted data is maintained. To this end, sophisticated error detecting and correcting codes have been devised. These codes require the addition of bits to the framed data code that is to be transmitted. Thus, a large portion of the transmitted frame is composed of frame synchronising codes, clock timing pulses and error detection and correction bits. In other words, the overhead required to synchronously or asynchronously transmit serial data is a substantial portion of the frame that transmits the data. Even so, in particularly noisy environments, redundant transmission is often resorted to in order to minimize data errors. Whether the environment is especially noisy or is less hostile to the accurate transmission and/or recording of data, it is generally the goal of the communications engineer to decrease the overhead required to transmit data.

SUMMARY OF THE INVENTION

It is therefore the principle object of the subject invention to provide a technique for the encoding of serial data which minimizes the framing and clock recovery data necessary to assure the accurate transmission of data.

It is another object of the invention to provide a redundant transmission scheme that minimizes the bits required for framing.

Briefly stated, the foregoing and other objects of the invention are attained by redundantly encoding the data so that the second data string of a data string pair is the logical inverse or complement of the first data string of the pair. The two data strings are separated by at least two binary bits, and the first data string of the data string pair is preceded by at least two binary bits. Thus, both data strings of the data string pair are preceded by a short header, but these headers are different. The headers must have at least one bit the same and at least one bit different. Using this scheme, there is for example only one pair of bits in the headers which are both binary ones. Recognizing this provides an unambiguous indication of the beginning of a data string. This and the complemented data strings provide all that is necessary for correct frame synchronism. In a preferred embodiment, clock or bit synchronism is achieved by dividing each binary bit period into n clock periods, where n might typically be eight. Bit synchronism is achieved by making a decision based on a center weighting technique. Thus, the overhead required to transmit data is reduced to a minimum while still retaining the high reliablity of redundant encoding.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
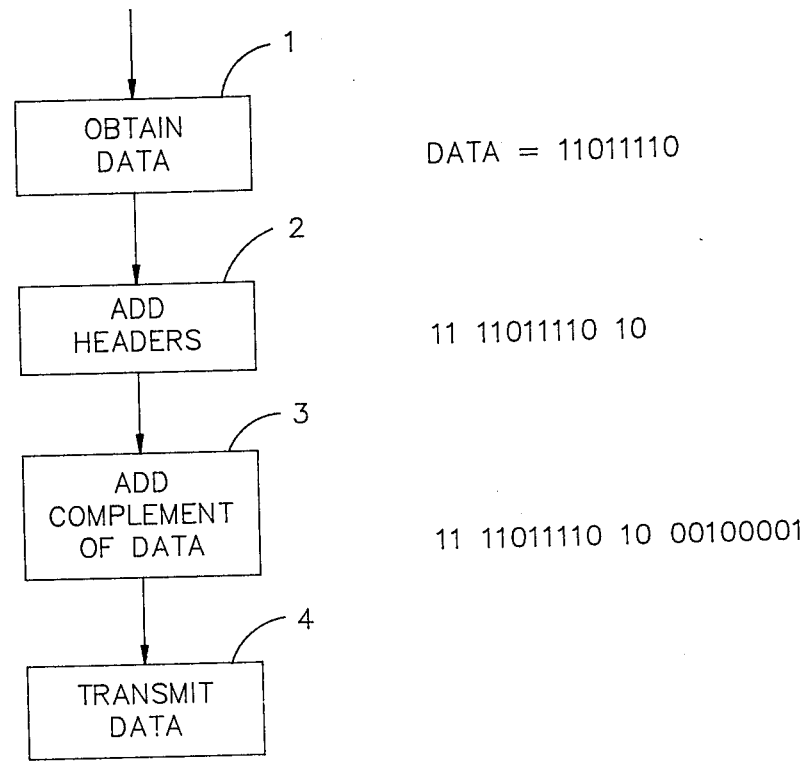
FIG. 1 is a flow chart illustrating the algorithm for encoding the bit stream.

The invention is perhaps best described by example. Assume the following conditions:
 First Header=1 1
 Second Header=1 0
 Information=0 1 1 1 0 1 1 1
Then, according to the invention, the transmitted data is as follows:

1 1 0 1 1 1 0 1 1 1 1 0 1 0 0 0 1 0 0 0

If one examines pairs of bits separated by nine bits in between, they will be complements of each other except in the one case of the first bits of the headers. In general, if the length (number of bits) of each header is H and the length of the information is I, then two bits separated by H+I−1 bits are identical only if they are corresponding bits in the headers. This is how framing is accomplished. The last 2H +2I bits are stored. Pairs of bits the appropriate distance apart are examined and the data is extracted if a frame is detected. The bit(s) that is different in the two headers is used to distinguish the data from its complement. Without that bit, a repeated transmission of the same data would be undistinguishable from a repeated transmission of the complement of the data.

To better appreciate the advantages of the encoding technique according to the invention, consider a known telemetry scheme in which the basic asynchronous transmission is to send one start bit, usually a "0", the data, and finally some number of stop bits, say for example two "1's". Using the same information bytes as in the example given above, the transmission would be as follows:

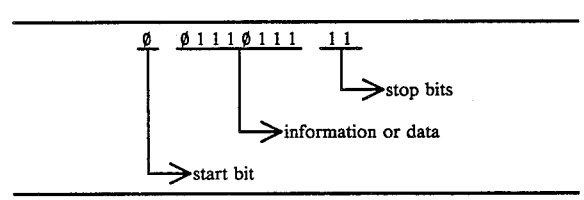

When no data is being sent, the transmitter continuously sends a "1". This system has been particularly useful because the data can be easily extracted by a mechanical device. A weakness of this system is that it relies on periods of inactivity (all "1's" transmitted) or distinct data being transmitted for correction of false frame synchronization. If no data is transmitted, a receiver can idle waiting for a start bit and properly synchronize. However, if the receiver is given a transmission with no inactive periods, it may not be able to properly synchronize. Consider the example above using one start "0" and two stop "1" bits and the following transmission:

01011111011011111111 01101111111 011 011111110111 ...

The transmission is ambiguous; it could be "correctly" decoded as either 1 1 0 1 1 1 1 1 or 1 1 1 1 1 1 1 0.

This problem can be circumvented by transmitting a number of stop bits nearly equal to or greater than the number of data bits, but this approach will lower the data rate significantly. For example, if eight stop bits are transmitted, there will be eight bits of data in seventeen bits transmitted.

The encoding technique according to the invention transmits according to the format 1 1 Data 1 0 $\overline{\text{Data}}$. Thus, there will be, for example, eight bits of data in 20 bits transmitted, but all of the information will be transmitted twice thereby providing superior data integrity, error detection capability and no ambiguous sequences. If a parity bit is added to both systems, the prior system would then provide only single-bit error detection whereas the encoding technique according to the invention provides single bit error correction.

An additional advantage of the encoding technique according to the invention is that it synchronizes faster than the prior system even when the old system is restricted to unambiguous sequences. If an old system receiver is improperly synchronized, it will be looking for a start bit inside the data. Suppose the receiver has interpreted a zero in bit position three as the start bit, then the receiver expects bit position three in the next byte to be a zero. If it is not, then the receiver must wait until it finds a zero and interprets it as the next start bit. Correct synchronization will be achieved when the receiver expects the real start bit to be the start bit. The receiver can move one bit every byte, and has a 50% chance of doing so at each step, relying on distinct data in each frame. If the receiver synchronizes n bits away from the true frame, it takes at least n frames to resynchronize, and on average 3/2n frames. No data is recovered unless a good deal of intelligence and an arbitrary amount of storage space is available to the system. Framing errors will be flagged with probability $(1-(\frac{1}{2})^s)$, where s is the number of stop bits.

In contrast, the encoding technique according to the invention requires 2H+2I bits of storage and synchronizes immediately, recovering the first complete frame received. Each recovered bit is shifted into a 2H+2I shift register (or equivalent), and if the result is a valid frame, the data is extracted. By counting the number of bits shifted in, the device can know when to expect a valid frame, and flag an error if one is not detected.

Synchronous transmission has the advantage that all of the synchronization (framing) is transmitted first, followed by a comparitively large amount of data. Therefore, a larger percentage of the total transmission carries information than in the asynchronous case. Of course, if the synchronization information is lost, all the data that followed it is lost as well, so synchronous transmission is limited primarily to high quality signal lines. If it is desirable to send the data twice, the technique according to the invention offers framing information in just four bits, i.e. the two headers. The only constraint is that the length of the information must be known to the reciver.

By sending the data twice, much greater data integrity can be achieved than CRC polynomial, Hamming or BCH codes. Data integrity is defined as the probability that received data is valid, given that the decoder did not detect an error. By incorporating the framing information economically, the increased integrity is achieved with little or no increase in transmission length. These and other error detecting/correction techniques could still be employed within the encoding technique according to the invention to achieve any desired characteristics of data integrity. An encoder according to the invention may be implemented in either hardware or software. The preferred implementation and best mode for the practice of the invention is in software. Any of several commercially available microcomputers may be used in the software implementation. These include, for example, the MC 6805 microcomputer manufactured by Motorola, Inc., the 3870/F8 microcomputer manufactured by Mostek Corporation, the MCS-48 microcomputer manufactured by Intel Corporation. It should be understood, however, that the practice of the invention is not limited to the use of a particular microcomputer. FIG. 1 shows the flow chart of a software implementation of the encoding algorithm. In block 1, the data is obtained. In the example illustrated, the data is 11011110. In block 2, the headers are added to the data, and in block 3, the complement of the data is added to complete the data string. Finally, in block 4, the data is transmitted; alternatively, the data may be recorded.

Figure 3:
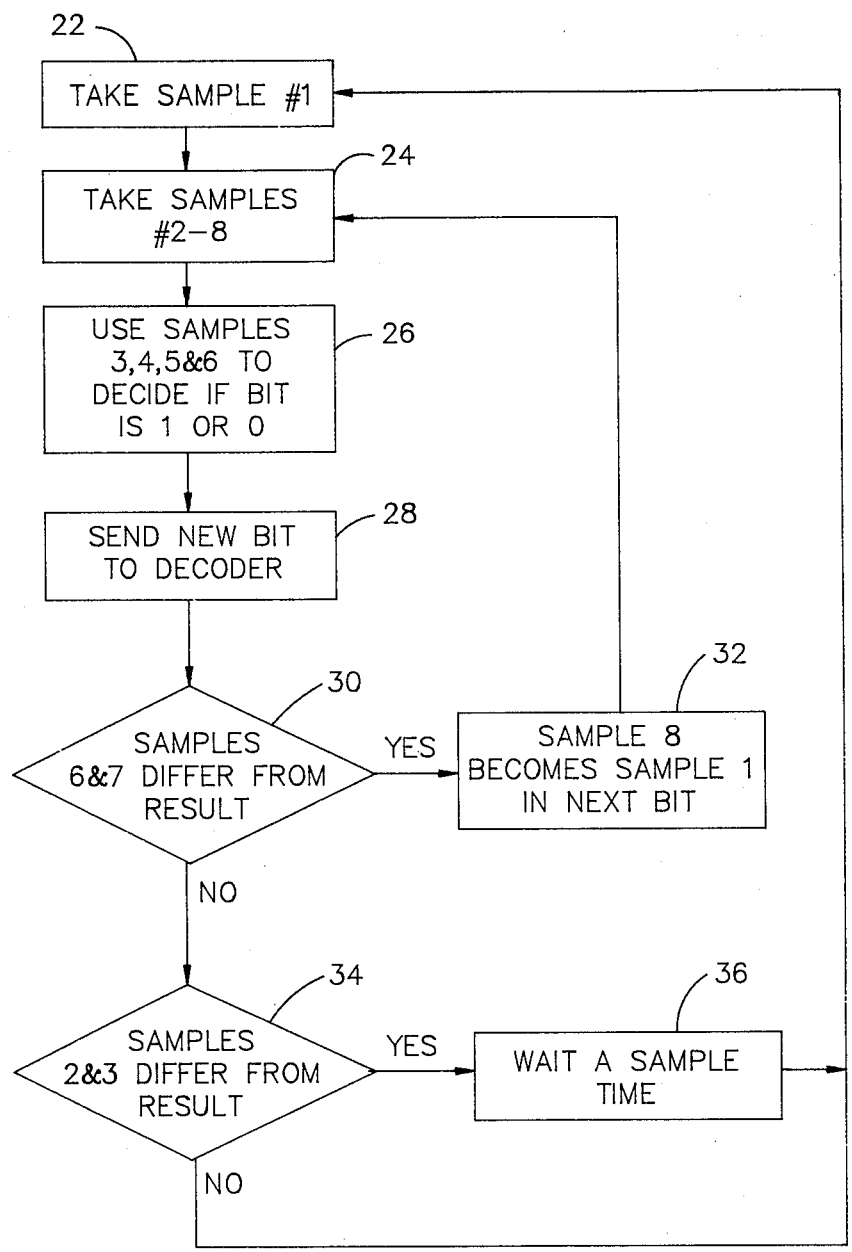
FIG. 3 is a flow chart illustrating the algorithm for bit extraction.

A system decoder may be implemented in either hardware or software. FIG. 3 shows the flow chart of a software implementation. As with the encoding algorithm, the decoding algorithm can be implemented with any one of several commercially available microcomputers. To decode a transmission in this system, the receiver must process the information one bit at a time. Therefore, the procedure begins with decision block 10 in which it is determined if a new bit is available. If so, the bit is shifted into the buffer in block 12; otherwise, the process returns. In decision block 14, it is determined if the first header is present. If so, then a decison is made in block 16 as to whether the second header is present. If so, the data fields are checked in block 18 to make sure that they are complements. If any of these tests fail, then the process returns. But if all the tests are affirmative, block 20 indicates to the processor that data is available.

Figure 2:
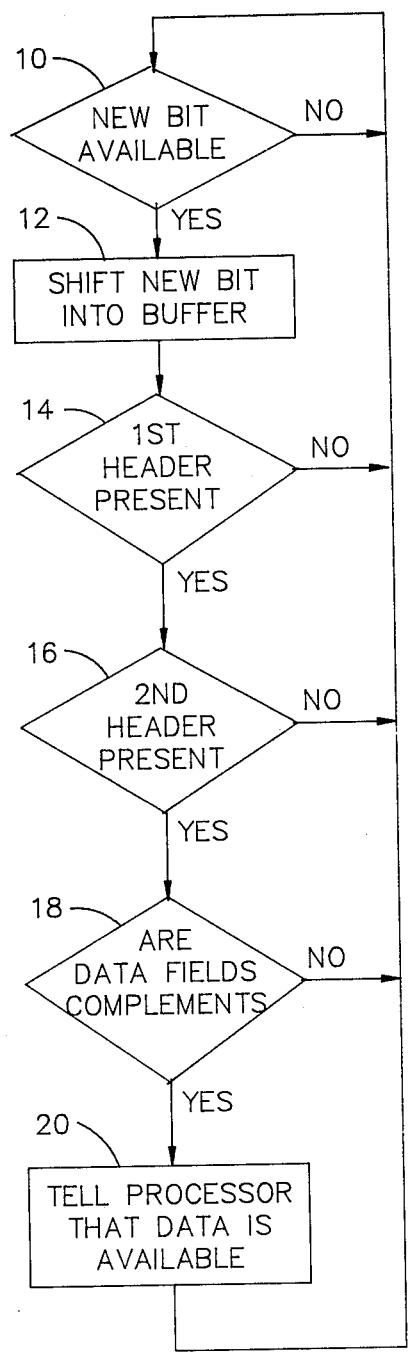
FIG. 2 is a flow chart illustrating the algorithm for decoding the bit stream.

Extracting the bits one at a time is a simple matter if they are accompanied by a clock. If they are not, a more sophisticated method must be employed. The invention also contemplates a technique for bit extraction. A device to extract bits can also be implemented in either hardware or software. FIG. 2 is a flow chart of a software implementation which, again, can be implemented with any one of several commercially available microcomputers. The algorithm assumes knowledge of the baud rate of the transmission. If this is not a priori knowledge, then sequences of "0's" and "1's" can be sampled and recorded and an approximation of the greatest common divisor of the lengths taken. This result should equal the number of samples per bit period.

As a specific example, assume that sampling is done at eight times the data rate. The technique according to the invention arbitrarily "frames" sequences of eight samples as one bit each. This is indicated in blocks 22 and 24 of FIG. 2. Then, in block 26 using a center weighting technique, samples three, four, five, and six are examined to decide if the bit is a "1" or "0". This decision is made by majority vote. If there is a transition (ones followed by zeros or vice-versa) in the middle of a frame, then the frame is moved forward or backward in the sequence of samples so that the true iddle of a bit is in the middle of a frame. In block 28, the detected bit (one or zero) is sent to the decoder. Then, to fully synchronize the system, samples six and seven are checked in block 30 to determine if they differ from the detected bit. If they do, then in block 32, sample eight becomes sample one of the next bit, and the process returns to block 24. Otherwise, samples two and three are checked in block 34 to see if they differ from the detected bit. If they do, then in block 36, the process waits one sample time and then returns to block 22. Otherwise, the process returns directly to block 22. Thus, this process makes the correct decision as to whether the bit is a one or zero after only one transition and is completely synchronized in at most four transitions.

The process just described uses certain samples to vote and corrects when transitions are detected within a certain range of the middle of the frame. Variations are possible in the number of samples, which samples are used to vote, how the adjustment is determined necessary and how much adjustment is made each time. The implementation described allows only the samples two and three or six and seven to disagree with the middle four samples, completely ignoring samples one and eight except for timing purposes. This implementation works well when bit transitions may jitter forward or backward but not affect the overall bit rate. This is a situation frequently encountered in AFSK data links and magnetic tape recording. Another variation on this method is to let the sample rate run slightly faster than it would in perfect synchronization and allow the algorithm only to adjust the frame backwards. These systems do require transitions in order to operate properly, but the encoding technique according to the invention guarantees at least two transitions per frame with the headers 1 1 and 1 0. More transitions can be guaranteed by increasing the header length, as for example headers 1 1 and 0 0 1.

Having thus described my invention, what I claim as new and desire to secure by Letters Patent is:

1. A method of encoding data for serial transmission or recording comprising the steps of
accepting a data string composed of binary "1's" and "0's" for transmission or recording,
complementing said data string,
providing each of said data string and its complement with a header, wherein at least one bit is the same in corresponding bit positions of the headers, said headers being used to identify and synchronize transmitted or recorded data by comparing said corresponding bit positions in the headers, and
framing the data to be transmitted or recorded by ordering said data string with its header and the complement of said data string with its header in series.

2. The method according to claim 1 wherein the two headers have at least two bits, at least one bit being the same and at least one bit being different in corresponding bit positions of the headers.

3. A method of decoding a serial bit stram encoded to the format $H_1$ Data $H_2$ $\overline{\text{Data}}$ where $H_1$ and $H_2$ are headers wherein at least one bit is the same in corresponding bit positions of the headers and Data is a data string and $\overline{\text{Data}}$ is its complement, said method comprising the steps of
shifting said serial bit stram into a buffer,
checking the bits in the buffer to detect the presence of the headers $H_1$ and $H_2$ and synchronize the data string by detecting the presence of identical bits in said corresponding bit positions of the headers,
if the headers $H_1$ and $H_2$ are detected, checking the data fields to confirm that the data strings are complements, and
if the data fields are complements, providing an indication that data is available, otherwise resume shifting said serial bit stram into the buffer and checking for the presence of the headers $H_1$ and $H_2$.

4. The method according to claim 3 wherein the two headers have at least two bits, at least one bit being the same and at least one bit being different in corresponding bit positions of the headers.

5. The method according to claim 3 further comprising extracting the bits individually from the serial bit stream prior to shifting into the buffer, the step of extracting comprising the steps of
sampling the bit stream at a rate n times the bit rate, where n is a positive integer,
framing sequences of n samples, ensuring that the center samples correspond to the center of the transmitted bit,
using all or part of the samples to determine if the bit is a "1" or a "0", and
sending the bit to the buffer.

6. The method according to claim 5 wherein $n=1$ and the serial bit stream is accompanied by a synchronous clock, said clock being used to sample the bit stream at or near the center of a bit time.

7. The method according to claim 5 wherein $n>1$, said method further comprising the steps of
detecting transitions in previous frames, and
moving the current frame forward or backward in the series of samples if the transitions occur near the center of the frame.

8. The method according to claim 7 wherein $n=8$ and the frame is moved backward if a transition occurs between the fifth and seventh samples, and the frame is moved forward if a transition occurs between the second and fourth samples.

9. The method according to claim 7 wherein the step of moving produces a forward or backward movement of more than a single sample.

10. The method according to claim 7 wherein the bit stream is sampled at a rate greater than n times the bit rate and the step of moving is made only in the backward direction.

11. The method according to claim 7 wherein the bit stream is sampled at a rate less than n times the bit rate and the step of moving is made only in the forward direction.

12. The method according to claim 5 wherein the determination as to whether a bit is a binary "1" or "0" is made by majority vote.

13. The method according to claim 5 further comprising the steps of
   detecting bit transitions, and
   increasing or decreasing the time between samples of at least a limited number of subsequent samples if the bit transitions occur near the center of the frame.

14. The method according to claim 13 wherein the step of increasing or decreasing the time between samples is performed for all subsequent samples.

15. A method of transmitting and receiving a serial data stream comprising the steps of
   accepting a data string composed of binary "1's" and "0's" for transmission,
   complementing said data string,
   providing each of said data string and its complement with a header, wherein at least one bit is the same in corresponding bit positions of the headers,
   framing the data to be transmitted by ordering said data string with its header and the complement of said data string with its header in series,
   serially transmitting the framed data to a receiver,
   receiving the transmitted data at said receiver,
   shifting the received data into a buffer,
   checking the bits in the buffer to detect the presence of the headers by detecting the presence of identical bits in said corresponding bit positions of the headers,
   if the headers are detected, synchronizing the receiver with the received data and checking the received data to confirm that the data strings are complements, and
   if the data strings are complements, providing an indication that data is available, otherwise resume shifting received data into the buffer and checking for the presence of the headers.

16. The method according to claim 15 wherein the two headers have at least two bits, at least one bit being the same and at least one bit being different in corresponding bit postions of the headers.

* * * * *